March 2, 1965 V. CABONI 3,171,373

DEVICE TO BE ADDED TO A LATHE, FOR SPINNING

Filed March 20, 1962

INVENTOR.

BY Vittorio Caboni

United States Patent Office 3,171,373
Patented Mar. 2, 1965

3,171,373
DEVICE TO BE ADDED TO A LATHE, FOR SPINNING
Vittorio Caboni, % Ing. Guazzo, Via XX Settembre, Turin, Italy
Filed Mar. 20, 1962, Ser. No. 182,708
4 Claims. (Cl. 113—53)

The object of this invention is a device to be applied to a lathe, during spinning.

For this type of work a metal disc is used (f.i. brass, aluminum etc.) which is held between a support and the die and is rotated at a relatively high speed, while at the same time pressure is applied against the disc, by the end of a rod formed tool, which is resting against a pivot, clamped to the base of the lathe and the other end of which is operated by the worker.

This operation done manually is slow and tiring and moreover the quality of the production depends very much on the skill of the worker, acquired through a long period of training. While with the use of this invention, a device is obtained for mounting on the lathe and which allows the operation to be done in a more rapid and economic way, without the application of a great deal of force on the side of the operator, who acquires the necessary skill in a short time.

The device is substantially composed of a carriage that can be moved on the longitudinal direction of the lathe and that carries a rod, through a system of parallelogram articulated joints. One end of this rod is a tool which shapes the spinning disc obliging it to follow the form of the die, while the opposite end is operated by the worker who, through an annular lever, one arm of which has a small wheel that slides along a cam, compels the end of this rod to follow a fixed path, corresponding to the deformation to be impressed on the disc.

Preferably the tool consists of a round body, pivoted at its centerline and free to rotate on it.

It has been found advantageous that the guide cam is composed of a straight section and a curved section and that the latter can be moved (by rotating it on a pivot, for instance) so it occupies different positions in the various manufacturing stages.

On the other side, as the cam is placed on the sliding carriage, also the pivot of rotation can be moved in the longitudinal direction of the lathe.

Other particulars and characteristics of the invention will become evident after the following description, which refers to the enclosed drawing, where:

Figure 1:
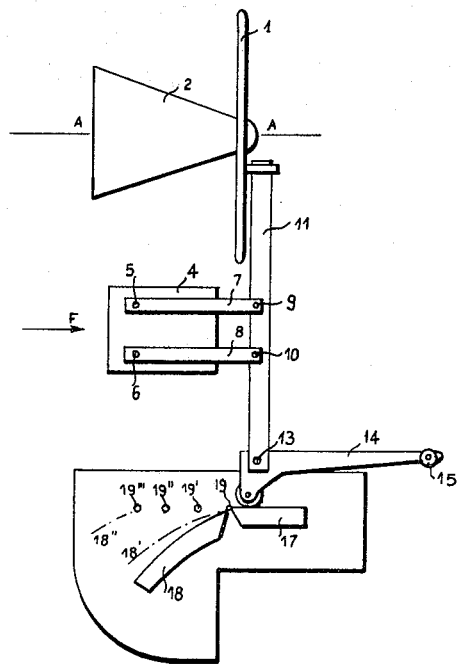
FIG. 1 is a schematic plan view of some parts of the lathe (not shown) to which this device has been applied, in a preferred form or realization, which is only used as an example.

As it can be seen on the drawing, disc 1 is fixed on the centerline A—A of a lathe for the working of plate. This disc is held between the bottom of the die 2 and the counter-die 3. The carriage 4 can slide back and forward in the longitudinal direction of the lathe, as shown by arrow F (preferably inclined with respect to the centerline A—A of the lath) and carries two pivot pins shown as 5 and 6, for two rods of equal length 7 and 8, the opposite ends of which are pivoted at 9 and 10 on a rod 11, which carries on one end the tool 12 and on the other end is pivoted at 13 on the angular lever 14 one arm of which has the handle 15 and the other arm has the roll 16 free to rotate and contacting the cam.

This cam includes the straight section 17 and the curved section 18 pivoted on the first at 19, that can rotate on said pin and be stopped in the selected position, relative to carriage 20 also sliding according to a required direction.

Figure 2:
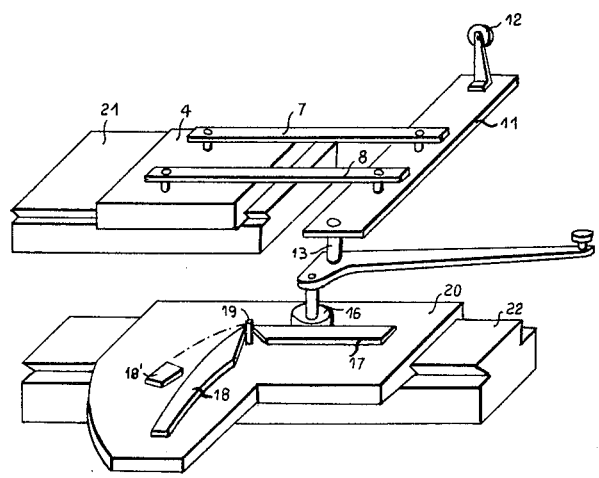
FIG. 2 is a schematic perspective view of the same device.

In FIGURE 2, the form of construction of the device described in the invention is more clear and the sliding guides 21 of carriage 4 and 22 of carriage 20 are also shown.

The operation is as follows:

Having placed disc 1 and started the rotation of the lathe, the two carriages 4 and 20 are carried to the end of their stroke on the right, then acting on lever 14 and moving carriage 4, the tool 12 advances with a combined movement toward centerline A—A and disc 1, until it contacts the latter near its center. The pressure applied on handle 15, strongly amplified by the angular lever 14 is transmitted to tool 12 which presses against disc 1 and deforms it into a concave form and then into a bell form, more and more closed.

Tool 12 follows this deformation, always keeping in contact with the disc and its stroke depending upon the travel of roll 16, which is pushed towards the left, contacting the working edge of curved cam 18. The disc begins to take the form shown as II.

When the operator realises that he cannot place any extra force on the lever 14 as the tool follows simply the deformation that the disc has already undergone, he moves cam 18 into the position 18' and fixes it in this position (by means of a pin or clamp not shown). Afterwards roll 16, following path 18", compels the tool 12 to advance more than before, according to the form of the cam. After this deformation has taken place, the worker moves towards the left the carriage 20 and the articulation 19 is placed by choice in the other points 19', 19'', 19''' etc., corresponding to which the profile 18 will move for instance in 18''' and the operation continues until the disc 1 takes the profile III and finally adapts itself to die 2, taking its definite form.

The articulated system formed by the arms 7 and 8 insures the foreseen connection between the movements of roll 16 and of tool 12.

It is evident that this invention can be used in many other ways, always having a point that effectuates a movement on a fixed path and a system of transmission (f.i. of the type of the pantograph) that transmits the movement of this point to the tool having the function of deforming the plate, or sheet.

In particular, the device can have various cams working in turn, each one of them fixing the path of the tool for a single time; or the tool can be driven by a movable arm and its length or the rotation centre can be changed.

Preferably the position of the rotation axis of the tool can be changed at will.

For the transmittal of movement, two movable carriages can be used, driven by a wormed drive in different directions or by a link drive or a hydraulic drive.

I claim:

1. A device adapted to be supported by a lathe for controlling the working movement of a spinning tool comprising: a longitudinal support means for mounting a spinning tool at one end thereof, a lever having two arm portions and a fulcrum point located between said arm portions, said fulcrum point defining a pivotal connection means for pivotably joining the other end of said longitudinal support means to said lever, first and second longitudinal guide means adapted to be mounted on said lathe and having their longitudinal axes parallel with the axis of the lathe, first and second carriage means slidably carried on said first and second guide means respectively for longitudinal movement along the longitudinal axes of said guide means, rod members pivotably connected at their ends at points intermediate the ends of said support means and at points on said second carriage for maintaining said rods in a parallel relation, a guide pattern mounted on said second carriage and adapted to be engaged by a follower mounted on one arm of said lever whereby movement of the other arm of said lever by an operator effects controlled angular displacement of said one arm.

2. A device according to claim 1 wherein said guide pattern includes a straight portion and a curved portion.

3. A device according to claim 2, wherein said curved portion is pivoted with respect to the straight portion, and can be fixed in a certain number of working positions.

4. A device according to claim 3, wherein said guide pattern, having said curved portion and said straight portion pivoted with respect to one another, is placed on a carriage provided with means adapted to give to it a sliding motion.

References Cited by the Examiner
FOREIGN PATENTS

| | | |
|---|---|---|
| 120,541 | 5/01 | Germany. |
| 358,199 | 9/22 | Germany. |
| 537,094 | 11/31 | Germany. |

CHARLES W. LANHAM, *Primary Examiner.*

WILLIAM J. STEPHENSON, *Examiner.*